(12) United States Patent
von Koenigsegg

(10) Patent No.: US 10,668,801 B2
(45) Date of Patent: Jun. 2, 2020

(54) POWERTRAIN FOR A VEHICLE

(71) Applicant: ALPRAAZ AB, Vejbystrand (SE)

(72) Inventor: Christian von Koenigsegg, Vejbystrand (SE)

(73) Assignee: ALPRAAZ AB, Vejbystrand (SE)

(*) Notice: Subject to any disclaimer, the term of this patent is extended or adjusted under 35 U.S.C. 154(b) by 154 days.

(21) Appl. No.: 15/525,740

(22) PCT Filed: Nov. 17, 2015

(86) PCT No.: PCT/EP2015/076824
§ 371 (c)(1),
(2) Date: May 10, 2017

(87) PCT Pub. No.: WO2016/079118
PCT Pub. Date: May 26, 2016

(65) Prior Publication Data
US 2017/0313174 A1 Nov. 2, 2017

(30) Foreign Application Priority Data
Nov. 17, 2014 (SE) ........................... 1451372

(51) Int. Cl.
B60K 6/48 (2007.10)
B60K 1/02 (2006.01)
(Continued)

(52) U.S. Cl.
CPC .................. B60K 6/48 (2013.01); B60K 1/00 (2013.01); B60K 1/02 (2013.01); B60K 6/28 (2013.01);
(Continued)

(58) Field of Classification Search
CPC ... B60K 6/48; B60K 6/28; B60K 6/38; B60K 6/50; B60K 17/356; B60K 1/00;
(Continued)

(56) References Cited

U.S. PATENT DOCUMENTS 3,799,284 A * 3/1974 Hender .................... B60K 1/02
180/65.25
3,858,674 A 1/1975 Tabor
(Continued)

FOREIGN PATENT DOCUMENTS

EP 0304919 A2 3/1989
EP 0913601 A1 5/1999
(Continued)

OTHER PUBLICATIONS

Japanese Patent Office Action dated Jun. 18, 2019 in re JP 2017-554944, which is a National Phase of WO 2016/079118 filed on Nov. 17, 2015.
(Continued)

Primary Examiner — Huan Le
(74) Attorney, Agent, or Firm — Gardner Groff & Greenwald, PC

(57) ABSTRACT

A powertrain (12) for a vehicle (10) is disclosed. The powertrain (12) comprises: a combustion engine (24), (ii) a drivetrain (14) having a torque converter (32) with a first state of operation in which the input (34) of the torque converter (32) is locked to the output (36) of the torque converter (32) and a second state of operation in which the input (34) of the torque converter (32) is not locked to the output (36) of the torque converter (32) for allowing slippage. The drivetrain also has a final drive (44) for supplying torque to the drive wheel (16) from the torque converter (32), wherein the final drive (44) is coupled to the torque converter (32) at a fixed gear ratio. The powertrain (12) further comprises: (iii) a first electric motor (28) configured to supply torque to the drivetrain (14) on the output-side of the torque converter (32).

12 Claims, 5 Drawing Sheets

(51) Int. Cl.
*B60K 7/00* (2006.01)
*B60K 1/00* (2006.01)
*B60W 10/08* (2006.01)
*B60K 17/356* (2006.01)
*B60K 6/28* (2007.10)
*B60K 6/38* (2007.10)
*B60K 6/50* (2007.10)
*B60W 10/02* (2006.01)
*B60W 20/00* (2016.01)
*F16H 61/14* (2006.01)
*B60K 5/02* (2006.01)
*B60K 5/00* (2006.01)

(52) U.S. Cl.
CPC ............. *B60K 6/38* (2013.01); *B60K 6/50* (2013.01); *B60K 7/0007* (2013.01); *B60K 17/356* (2013.01); *B60W 10/026* (2013.01); *B60W 10/08* (2013.01); *B60W 20/00* (2013.01); *F16H 61/143* (2013.01); *B60K 5/02* (2013.01); *B60K 2001/001* (2013.01); *B60K 2005/003* (2013.01); *B60K 2007/0061* (2013.01); *B60W 2710/024* (2013.01); *B60Y 2200/92* (2013.01); *B60Y 2400/114* (2013.01); *Y02T 10/6221* (2013.01); *Y02T 10/6265* (2013.01); *Y10S 903/912* (2013.01); *Y10S 903/946* (2013.01)

(58) Field of Classification Search
CPC ............. B60K 1/02; B60K 7/0007; B60K 2007/0061; B60K 5/02; B60K 2005/003; B60K 2001/001; B60W 10/026; B60W 10/08; B60W 20/00; B60W 2710/024; B60Y 2400/14; B60Y 2200/92

See application file for complete search history.

(56) References Cited

U.S. PATENT DOCUMENTS

| | | | |
|---|---|---|---|
| 4,098,144 A | 7/1978 | Besel et al. | |
| 4,388,977 A | 6/1983 | Bader | |
| 4,697,660 A | 10/1987 | Wu et al. | |
| 4,923,025 A | 5/1990 | Ellers | |
| 5,415,603 A | 5/1995 | Tuzuki et al. | |
| 5,551,932 A | 9/1996 | Ishii et al. | |
| 5,562,565 A | 10/1996 | Moroto et al. | |
| 5,675,203 A | 10/1997 | Schulze et al. | |
| 5,697,466 A | 12/1997 | Moroto et al. | |
| 5,887,670 A | 3/1999 | Tabata et al. | |
| 6,024,667 A | 2/2000 | Krohm et al. | |
| 6,179,078 B1 | 1/2001 | Belloso | |
| 6,254,507 B1 | 7/2001 | Downs | |
| 6,328,122 B1 | 12/2001 | Yamada et al. | |
| 6,359,404 B1 | 3/2002 | Sugiyama et al. | |
| 6,376,927 B1 | 4/2002 | Tamai et al. | |
| 6,419,040 B2 | 7/2002 | Kitano et al. | |
| 6,474,428 B1 | 11/2002 | Fujikawa et al. | |
| 6,492,742 B1 | 12/2002 | Fujikawa et al. | |
| 6,506,139 B2 | 1/2003 | Hirt et al. | |
| 6,528,959 B2 | 3/2003 | Kitano et al. | |
| 6,808,470 B2 | 10/2004 | Boll | |
| 7,073,616 B2 | 7/2006 | Itoh et al. | |
| 7,096,099 B2 | 8/2006 | Itoh et al. | |
| 7,130,731 B2 | 10/2006 | Itoh et al. | |
| 7,516,807 B2 | 4/2009 | Carlson | |
| 7,690,454 B2 | 4/2010 | Rose | |
| 7,770,676 B2 | 8/2010 | Tenbrock et al. | |
| 7,810,592 B2 | 10/2010 | Klemen et al. | |
| 8,347,998 B2 | 1/2013 | Ericson et al. | |
| 8,534,399 B2 | 9/2013 | Soliman et al. | |
| 8,758,180 B2 | 6/2014 | Frai et al. | |
| 8,813,935 B2 | 8/2014 | Hart et al. | |
| 2001/0005704 A1 | 6/2001 | Kitano et al. | |
| 2002/0035006 A1 | 3/2002 | Suzuki et al. | |
| 2002/0040835 A1 | 4/2002 | Fukukawa et al. | |
| 2002/0179047 A1 | 12/2002 | Hoang et al. | |
| 2002/0179351 A1 | 12/2002 | Shimabukuro et al. | |
| 2003/0000751 A1 | 1/2003 | Denton et al. | |
| 2004/0041402 A1 | 3/2004 | Dehrmann | |
| 2005/0090365 A1 | 4/2005 | Tamai et al. | |
| 2005/0133328 A1 | 6/2005 | Masuya | |
| 2007/0087884 A1 | 4/2007 | Janssen | |
| 2007/0184928 A1 | 8/2007 | Yasui et al. | |
| 2007/0246274 A1 | 10/2007 | Dreibholz et al. | |
| 2007/0246275 A1 | 10/2007 | Dreibholz et al. | |
| 2008/0081730 A1 | 4/2008 | Lee et al. | |
| 2008/0254940 A1 | 10/2008 | Stoffels et al. | |
| 2008/0264051 A1 | 10/2008 | Ericson et al. | |
| 2008/0312800 A1* | 12/2008 | Satou | F16H 61/143 701/68 |
| 2009/0288894 A1 | 11/2009 | Rose | |
| 2009/0288895 A1 | 11/2009 | Klemen et al. | |
| 2009/0312144 A1 | 12/2009 | Allgaier et al. | |
| 2009/0321157 A1 | 12/2009 | Sowul et al. | |
| 2010/0044129 A1 | 2/2010 | Kyle | |
| 2010/0084207 A1 | 4/2010 | Wyall | |
| 2010/0234169 A1 | 9/2010 | Miyazaki et al. | |
| 2010/0234171 A1 | 9/2010 | Tanba et al. | |
| 2010/0234172 A1 | 9/2010 | Miyazaki et al. | |
| 2010/0234173 A1 | 9/2010 | Miyazaki et al. | |
| 2010/0234174 A1 | 9/2010 | Miyazaki et al. | |
| 2010/0262323 A1 | 10/2010 | Tanba et al. | |
| 2010/0262324 A1 | 10/2010 | Hatori et al. | |
| 2011/0005215 A1 | 1/2011 | Ota et al. | |
| 2012/0181765 A1 | 7/2012 | Hill et al. | |
| 2013/0071214 A1 | 3/2013 | Itou et al. | |
| 2013/0096754 A1 | 4/2013 | Dalum et al. | |
| 2014/0083247 A1 | 3/2014 | Osuka et al. | |
| 2014/0100075 A1* | 4/2014 | Tabata | B60K 6/44 477/3 |
| 2014/0202282 A1 | 7/2014 | Masui et al. | |
| 2014/0236411 A1 | 8/2014 | Amano | |
| 2014/0254861 A1 | 9/2014 | Masui | |
| 2014/0346864 A1* | 11/2014 | Chemin | B60R 16/03 307/10.6 |

FOREIGN PATENT DOCUMENTS

| | | |
|---|---|---|
| EP | 0828623 B1 | 5/2000 |
| EP | 1205329 A2 | 5/2002 |
| EP | 1925521 A2 | 5/2008 |
| EP | 2030857 A2 | 3/2009 |
| EP | 2068042 A1 | 6/2009 |
| EP | 2371646 A1 | 10/2011 |
| EP | 2527219 A1 | 11/2012 |
| EP | 2644468 A1 | 10/2013 |
| EP | 2644941 A1 | 10/2013 |
| EP | 2644942 A1 | 10/2013 |
| EP | 2650184 A1 | 10/2013 |
| EP | 2653363 A1 | 10/2013 |
| EP | 2653364 A1 | 10/2013 |
| EP | 2684727 A1 | 1/2014 |
| EP | 2700526 A1 | 2/2014 |
| EP | 2727788 A1 | 5/2014 |
| EP | 2733000 A1 | 5/2014 |
| EP | 2733001 A1 | 5/2014 |
| JP | 105305823 | 11/1993 |
| JP | 1995300030 | 11/1995 |
| JP | 2004257518 | 9/2004 |
| JP | 2009108955 | 5/2009 |
| WO | WO89/04081 A1 | 5/1989 |
| WO | WO96/22894 A1 | 8/1996 |
| WO | WO2006/038968 A1 | 4/2006 |
| WO | WO2007/043875 A1 | 4/2007 |
| WO | 2009056953 | 5/2009 |
| WO | WO2009/071402 A1 | 6/2009 |
| WO | WO2009/113347 A1 | 9/2009 |
| WO | WO2010/053920 A2 | 5/2010 |
| WO | WO2012/017531 A1 | 2/2012 |
| WO | WO2012/053116 A1 | 4/2012 |
| WO | 2012164699 | 12/2012 |
| WO | WO2013/001616 A1 | 1/2013 |

(56) References Cited

FOREIGN PATENT DOCUMENTS

| WO | WO2013/046382 A1 | 4/2013 |
| WO | WO2013/054409 A1 | 4/2013 |
| WO | 2013-061413 | 5/2013 |
| WO | WO2013/072998 A1 | 5/2013 |
| WO | WO2013/108397 A1 | 7/2013 |
| WO | WO2013/122101 A1 | 8/2013 |
| WO | WO2014/022698 A1 | 2/2014 |
| WO | 2016079118 | 11/2015 |

OTHER PUBLICATIONS

Japanese Patent Office Action Summary in re JP 2017-554944, which is a National Phase of WO 2016/079118 filed on Nov. 17, 2015.

* cited by examiner

POWERTRAIN FOR A VEHICLE

CROSS-REFERENCE TO OTHER APPLICATIONS

This application is a national phase application under 35 U.S.C. § 371 of international application PCT/EP2015/076824, filed Nov. 17, 2015 which claims the benefit of priority to Swedish Application No. 1451372-5 filed on Nov. 17, 2014, the entire teachings of which are incorporated herein by reference.

TECHNICAL FIELD

The present invention relates to a powertrain for a land vehicle. In particular, the present invention relates to a powertrain that involves a combustion engine and one or more electric motors and that enables the engine and motors to work independently, in parallel and/or in series. The present invention further relates to a land vehicle employing such a powertrain, and to a drivetrain that is suitable for such a powertrain.

BACKGROUND

The powertrain of a land vehicle commonly has an internal combustion engine that supplies power and torque to one or more drive wheels via a drivetrain. The drivetrain typically has clutch or a torque converter. An internal combustion engine, and in particular a reciprocating engine, has a minimum rotational speed at which it can operate and deliver torque. Rotational speed is understood as the number of rotations or revolutions per unit time. The clutch or the torque converter allows for a slippage between the combustion engine and the drive wheels, so that the combustion engine can operate with the drive wheels being still or rotating slower than the rotation of the combustion engine.

In the drivetrain, the clutch or torque converter is typically followed by a gearbox, which in turn is coupled to a final drive. The gearbox may be manually or automatically operated, and stepwise or continuously variable. The final drive typically has a fixed gear ratio that is greater than one, thus delivering an output torque that is greater than its input torque. The final drive has the function converting the output torque from the gear switching mechanism of the gearbox to an output torque that is suitable for the drive wheels. In a car, the final drive and the differential are typically joined in a single unit. In a motorcycle, the final drive is typically constituted by a chain, belt or cardan drive between the gearbox and the wheel axle.

An internal combustion engine operates optimally within a limited range of rotational speeds. The gearbox provides a variable speed ratio between the combustion engine and the drive wheels and allows for the combustion engine to operate optimally at a broader range of vehicle speeds. The gearbox also provides a variable gear ratio, and in conjunction with the final drive, it has the function of delivering a torque to the drive wheels that is suitable at the current speed of a vehicle. The gearbox is particularly important for reciprocating engines in road vehicles, due to the above-mentioned minimum rotational speed, and to the fact that the road vehicles must be able to function at a wide range of speeds.

A gearbox is typically a heavy, large and expensive component in a drivetrain. There are also energy losses when converting the rotational speed from the input to the output. The strength and size of a vehicle body must be adapted to carry the gearbox, which further increases the weight of the vehicle. Thus, the weight and energy consumption of the gearbox has a negative impact on the acceleration and fuel consumption of the vehicle.

A fast acceleration is desired in many situations. Thus, it is an object of the present invention to improve the acceleration of a vehicle. It is a further object of the present invention to reduce the environmental impact of vehicle.

GENERAL DESCRIPTION

The above objects, and further objects that can be construed from the description, are achieved by the first aspect of the present invention, which is constituted by a powertrain for supplying torque to a drive wheel of a vehicle. The powertrain comprises a combustion engine having an output for supplying torque and a drivetrain for conveying torque from the combustion engine to the drive wheel. The drivetrain comprises a coupling having an input coupled to the output of the combustion engine for receiving torque therefrom and an output for supplying torque, wherein the coupling has a first state of operation and a second state of operation. Torque supplied to the input of the coupling is conveyed to the output of the coupling in the first state of operation, wherein in the first state of operation, the input of the coupling is locked to the output of the coupling for avoiding slippage there between. In the second state of operation, the input of the coupling is not locked to the output of the coupling for allowing slippage there between. The drivetrain further comprises a connection having an input coupled to the output of the coupling for receiving torque therefrom and an output for supplying torque to the drive wheel, wherein the input of the connection is coupled to the output of the coupling at a fixed gear ratio. The powertrain further comprises a first electric motor configured to supply torque to the drivetrain on the output-side of the coupling.

The vehicle may be a road vehicle, such as a car or motorcycle. Road vehicle is here understood to encompass vehicles that can drive faster than 90 km/h on a paved road surface. The combustion engine may be an internal combustion engine. Additionally, the internal combustion engine may be a reciprocating engine, such as a petrol or diesel engine for driving a car.

A fixed gear ratio is here understood as the gear ratio not being changeable. The fixed gear ratio may be 1, which means that it does not contribute to a mechanical advantage in the drivetrain. Gear ratio is to be understood in its general meaning. For example, the gear ratio may be calculated as the number of teeth of an output gear divided by the number of teeth of a meshing input gear. If there are no torque losses, the torque ratio may be calculated as an output torque divided by an input torque of a gear train. On the output-side of the coupling is understood to encompass at the output of the coupling. It also encompasses between the output of the coupling and the drive wheel. Again, a fixed gear ratio is here understood as the gear ratio being unchangeable. The drivetrain may be configured to match the rotation at the output of the coupling to the rotation at input of the connection.

With the combined features of the first aspects, the powertrain may be configured to operate without a gear shifting mechanism in the drivetrain. A gear shifting mechanism is here understood to encompass a stepwise gear shifting mechanism and a continuous gear shifting mechanism.

In the first state, the mechanical coupling allows for torque supplied by the combustion engine to be conveyed with little or no losses to the drive wheel. This improves the acceleration of a vehicle at higher rotational speeds of the drive wheel. In the second state, the combustion engine may operate even if the rotational speed of the drive wheel is low or zero. Thus, the combustion engine may be operating before switching from the second state of operation to the first state of operation and immediately contribute with full torque, which contributes to a faster acceleration after switching from the second state to the first state.

The coupling has to some extent the function of a clutch or a torque converter. The input of the connection is coupled to the output of the coupling at a fixed gear ratio. This means that there cannot be a gearbox between the coupling and the connection. The drivetrain has no gearbox that contributes to the weight of the vehicle, which contributes to improving the acceleration of the vehicle and reduced drivetrain losses as less gears are engaged. A gearbox does not add torque to a drivetrain, but only converts it up or down. The first electric motor adds weight to the vehicle, but it also supplies torque and energy to the drivetrain. Thus, the powertrain may supply a higher torque to the drive wheel than a powertrain with a gear box. Additionally, the first electric motor allows for more power to be inputted in the powertrain. The input of the connection may be locked to the output of the coupling. This means that the input of the connection cannot be disconnected from the output of the coupling, for example by a clutch.

The powertrain may contribute to increase the comfort level in the vehicle compared to powertrains involving manual transmission, automated manual transmissions, dual-clutch transmission or automatic transmission, as it has a continuous drive and no step gears. Furthermore, the proposed power train may give a better response to driver input, since neither a shift down in gears is necessary, nor is an adjustment of the rotational speed of the combustion engine required. Shifting of gears, e.g. in automatic transmission, and adjustments of engine rotational speeds, e.g. in continuously variable transmission, take time.

This is avoided in the powertrain according to the first aspect, which contributes to a faster and smoother acceleration. This will be particularly noticeable when accelerating hard.

The electric motors described in relation to the different aspect of the invention may supply a torque when standing still, i.e. at a zero rotational speed. A combustion engine cannot operate and supply a torque under a certain rotational speed. Thus, the first electric motor has the effect that the powertrain can supply more torque when the drive wheel is standing still or rotating slowly. This means that a vehicle with this powertrain can accelerate faster at zero or low speed.

As discussed above, the drivetrain according to the first aspect has no gearbox that contributes to the weight of the vehicle and adds losses to the drivetrain, which also contributes to reducing the energy consumption when accelerating the vehicle. The first electric motor also adds weight to the vehicle, but the electric energy used for driving the first electric motor may come from a source that has little or no negative impact on the environment. Thus, the powertrain may be optimized for having a lower environmental impact on the environment than a powertrain involving a gearbox.

The powertrain as a whole may be configured to operate without a gearbox. The input of the coupling may be coupled to the output of the combustion engine at a fixed gear ratio. Thus, a gear shifting mechanism, stepwise or continuously operated, cannot be present between the combustion engine and the coupling. Thus, no such a mechanism adds to the weight to the drivetrain and the vehicle, and reduced acceleration and increased environmental impact is avoided. The input of the coupling may be locked to the output of the combustion engine. This means that the input of the coupling cannot be disconnected from the output of the combustion engine, for example by a clutch.

Torque supplied to the input of the coupling may be conveyed to the output of the coupling in the second state of operation. This allows for the combustion engine to supply torque at low or zero rotational speeds of the drive wheel, which contributes to an increased acceleration under these conditions.

The coupling may be torque converter. The torque converter may be configured to provide a mechanical coupling between the input and the output of the coupling in the first state of operation and a fluid coupling between the input and the output of the coupling in the second state of operation. The mechanical coupling may rigidly lock the input of the coupling to the output of the coupling in the first state of operation. The torque converter may comprise an impeller and a turbine, and the impeller may be coupled to the input of the coupling and the turbine may be coupled to the output of the coupling. The torque converter may be configured for supplying a torque from its output that is greater than a torque received to its input in the second state of operation. This has the advantage that a higher torque can be supplied to the drive wheel at low or zero rotational speeds of the drive wheel, which contributes to an improved acceleration. The torque converter may be configured for supplying a torque from its output that is greater than a torque received to its input in the second state of operation when the rotational speed of the input of the torque converter is greater than the rotational speed of the output of the torque converter.

Alternatively to the torque converter, the coupling may be a clutch. Additionally, the clutch may be a wet clutch.

The connection may be configured to transfer a torque received at its input to its output. The transfer may be at a fixed gear ratio, or without any stepped or continuous gears. Transfer of a torque is here understood to encompass the transfer of a torque without a conversion, or at a fixed gear ratio that is equal to 1. This means that the connection does not change the mechanical advantage of the drivetrain. The connection may be an axle connecting the output of the coupling to the drive wheel. The axle may further be configured to lock the rotation of the output of the coupling to the drive wheel. This locking has the effect that the output of the coupling and the drive wheel rotate at the same rotational speed.

This allows for a compact powertrain with a minimum weight, which contributes to an improved acceleration.

The connection may be a final drive. The final drive may be configured to convert the torque received at its input to a torque supplied from its output. The final drive may be configured to convert a torque received at its input to a higher torque supplied from its output. This allows for a higher torque supplied to the drive wheel, which improves the acceleration of the vehicle. Additionally or alternatively, the final drive may be configured to convert a rotational speed at its input to a lower rotational speed at its output. This allows for the combustion engine to operate at a higher rotational speed relative to the rotational speed of the drive wheel. The torque from a combustion engine varies with its rotational speed, and the final drive therefore allows for an optimization of the torque output at a given rotational speed of the drive wheel and of the acceleration characteristics of the vehicle as a whole.

The final drive may be configured to convert the torque received at its input to a torque supplied from its output at a fixed gear ratio. The final drive may comprise a bevel gear. A bevel gear is typically used in drive shaft operated vehicles. The final drive may comprise a chain drive or a belt drive for transferring torque from the input to the output of the final drive. This technology is typically employed in motorcycles. The final drive may be configured, in the first state of operation of the coupling, to convert the rotational speed of the combustion engine to a lower rotational speed of the drive wheel. The final drive may be the only part of the drivetrain having this function in the first state of operation of the coupling.

Under conditions comprising: the torque converter being in its second state; the powertrain, or drivetrain, may be configured to: change the state of the torque converter from its second state to its first state if the rotational speed of the output of the torque converter reaches, approaches, or becomes the same as the rotational speed of the input of the torque converter. Here, the term reaching is understood to encompass becoming the same as, having changed to be the same as, and being adapted to.

The conditions may further comprise: the rotational speed of the input of the torque converter being the same as or greater than the rotational speed of the output of the torque converter. The conditions, or initial consitions, may further comprise: the input of the torque converter being supplied with torque from the combustion engine. Additionally or alternatively, the conditions, or initial consitions, may comprise: the rotational speed of the output of the torque converter being zero.

The powertrain may be configured to: supply torque to the drivetrain on the output-side of the torque converter with the first electric motor simultaneously to torque being supplied to the input of the torque converter from the combustion engine, Similarly, the drivetrain may be configured to: receive torque on the output-side of the torque converter with the first electric motor simultaneously to torque being supplied to the input of the torque converter from the combustion engine. This has the effect that the rotational speed of the output of the torque converter can reach the rotational speed of the input of the torque converter quicker, which improves the efficiency of the powertrain by reducing losses in the torque converter.

Under conditions comprising: the torque converter being in its first state and the input of the torque converter being supplied with torque from the combustion engine, the powertrain or drivetrain may be configured to: change the state of the torque converter from its first state to its second state if the rotational speed of the output decreases, reaches the minimum rotational speed at which the combustion engine can operate and deliver torque, and/or is below a predetermined value. These features have the effect that engine breaking is possible. The decrease may be below a predetermined rotational speed of the output.

Under conditions comprising: the torque converter being in its first state and the input of the torque converter being supplied with torque from the combustion engine, the powertrain or drivetrain may be configured to: change the state of the torque converter from its first state to its second state if the torque supplied to the input of the torque converter from the combustion engine increases. Additionally, a further requirement for the change may be if the rotational speed of the output of the torque converter is below a predetermined limit. These features have the effect that the torque from the combustion engine can be multiplied by the torque converter and a greater acceleration can be achieved while already driving, for example when overtaking another vehicle.

Under conditions comprising: the torque converter being in its first state and the rotational speed of the input of the torque converter is non-zero and decreasing, non-zero and constant, non-zero and increasing, or zero; the powertrain, or drivetrain, may be configured to: change the state of the torque converter from its first state to its second state if the torque supplied to the input of the torque converter from the combustion engine increases or is increased. Additionally, a further requirement for the change may be if the rotational speed of the output of the torque converter is below a predetermined limit. The conditions may further comprise: the input of the torque converter being supplied with torque from the combustion engine. These features also have the effect that the torque from the combustion engine is multiplied by the torque converter and therefore contributes to an increased acceleration.

The powertrain, or drivetrain, may be configured to: determine the conditions. The conditions are understood to encompass initial conditions that are in effect prior to the change the state of the torque converter. The powertrain, or drivetrain, may comprise a control unit for controlling changes between the first state and the second state of the torque converter.

The first electric motor may be configured to supply torque between the coupling and the connection. If the connection is a final drive, it may increase a torque that is supplied to its input. With the proposed configuration, the torque supplied by the first electric motor is also increased by final drive, which may further contribute to an increased acceleration.

Alternatively, the first electric motor may be configured to supply torque between the connection and the drive wheel. This has the advantage that the link between the coupling and the input of the connection and the connection as such do not need to be dimensioned for additional torque supplied by the first electric motor, which means that the drivetrain can be made lighter and the vehicle accelerate faster. Alternatively, the first electric motor may be configured to connect to the drive train and supply torque via the connection.

The first electric motor may be configured to supply torque directly to the drive wheel. Further, the first electric motor may wheel hub motor centered on the axle of the drive wheel.

The drivetrain may comprise a first freewheel positioned between the first electric motor and the combustion engine and having an input for receiving a torque conveyed from the combustion engine and an output for conveying the torque toward the drive wheel, wherein the first freewheel is configured to disengage its input from its output when the output rotates faster than the input. This way, the powertrain may be operated by the first electric motor with the combustion engine turned off with little or no resistance from the combustion engine, which means that the energy consumption of the first electric motor is reduced. The first freewheel may be a sprang. Additionally or alternatively, the first freewheel may be positioned between the first electric motor and the output of the coupling. This allows for the powertrain to be operated by the first electric motor with the combustion engine turned off and without any resistance from the coupling. The first freewheel may be positioned between the output of the coupling and the input of the connection, or the first connection may comprise the first freewheel and the first freewheel may be positioned between the input and output of the connection.

The coupling may be configured to allow opposite rotations of the input and the output of the coupling in its second state of operation. The first electric motor may be configured to have a changeable direction of the torque supplied to drivetrain. This way, the first electric motor may be used for rotating the drive wheel in a direction that is opposite the rotational direction provided by the combustion engine with the coupling in its second state of operation. This technology may be employed for reverse driving of the vehicle, and has the advantage that no weight is added for facilitating this function, which contributes to avoiding a reduced acceleration.

The drivetrain may further comprise a connector for conveying torque from the output of the connection to the drive wheel. The connector may be configured to convey a torque to the drive wheel at a fixed gear ratio, and the connector may comprise a drive axle. Additionally or alternatively, the first electric motor may be configured to supply torque to the connector.

The powertrain may further comprise a second electric motor configured to supply torque to the drivetrain via the input of the coupling. The second electric motor may be configured to supply torque to the drivetrain at the input of the coupling or between the output of the combustion engine and the input of the coupling. The torque supplied by the second electric motor contributes to an increased acceleration.

The drivetrain may comprise a second freewheel positioned between the second electric motor and the combustion engine and having an input for receiving a torque conveyed from the combustion engine and an output for conveying the torque toward the drive wheel, wherein the second freewheel is configured to disengage its input from its output when the output rotates faster than the input. This way, the powertrain may be operated by the second electric motor with the combustion engine turned off and with little or no resistance from the combustion engine. The second freewheel may be a sprang.

The combustion engine may be a cylinder engine that comprises a crankshaft coupled to the output of the combustion engine, and the combustion engine may further comprise an input coupled to the crank shaft for receiving torque from the second electric motor, and the input and output of the combustion engine are coupled via the crankshaft. This configuration has the advantage that the combustion engine and the coupling may be built as a more compact unit, which means that the body of the vehicle can be made smaller and lighter, and a faster acceleration may be achieved. This is particularly the case when the second electric motor is smaller than the coupling, since then unoccupied space between the combustion engine and the coupling can be avoided.

The second electric motor may be configured to function as a starter motor for the combustion engine when the coupling is in its second state of operation. This has the advantage that no additional starter motor is required, which leads to a lighter weight and faster acceleration.

The second electric motor may be configured to supply torque to the combustion engine for increasing the engine speed of the combustion engine when the coupling is in its second state of operation. A combustion engine typically delivers a sub-optimal torque at low rotational speeds. This feature therefore has the effect that if the combustion engine is turned off or idling, it may quicker reach a rotational speed that delivers a higher torque, which contribute torque a faster acceleration.

The powertrain may further comprise an energy storage configured to supply electric energy to the first electric motor for driving the first electric motor. The first electric motor may be configured to function as a generator and generate electric energy from torque received from the drivetrain and to supply the electric energy to the energy storage. Alternatively or additionally, the energy storage may be configured to supply electric energy to the second electric motor for driving the second electric motor. The second electric motor may be configured to function as a generator and generate electric energy from torque received from the drivetrain and to supply the electric energy to the energy storage. This way, the powertrain may function without a generator dedicated for only generating electric power, which reduces the weight of the vehicle and increases the acceleration.

The first electric motor and/or the second electric motor may be configured to generate electric energy from torque supplied from the combustion engine via the drivetrain. Fuel for the combustion engine may thus be used for charging the energy storage. If a renewable fuel is used, the environmental impact when operating the vehicle is thus limited. Additionally or alternatively, the first electric motor or the second electric motor may be configured to generate electric energy from torque supplied from the drive wheel via the drivetrain. This way, the kinetic energy of the vehicle may be converted to potential energy that, to some extent, is preserved in the energy storage, which reduces the environmental impact when driving the vehicle.

The second electric motor may be configured to function as a generator and generate electric energy from torque received from the combustion engine to supply the electric energy to the energy storage when the coupling is in its second state of operation. This allows for the energy storage to be charged when the vehicle is standing still or moving a low speed.

The energy storage may comprise a supercapacitor for storing energy. A supercapacitor is here understood to encompass ultracapacitors, electric double-layer capacitors, and electrochemical capacitors. Supercapacitors have energy densities that are greater than for capacitors, and power densities that are greater than for batteries. Additionally, supercapacitors tolerate many more charge and discharge cycles than batteries. Thus, they last longer and have to be replaced less frequently, and may therefore have less impact on the environment. These characteristics of supercapacitors make them suitable for rapid accelerations.

The energy storage may be configured to supply electric energy during acceleration from zero to maximum speed of the vehicle. Thus, the electric motors may contribute with torque throughout a full acceleration from zero. Additionally or alternatively, the energy storage may be configured to supply an amount of energy that is less than twice the electric energy required for full acceleration from zero to maximum speed of the vehicle. A larger energy storage capability would be heavier. Thus, a faster acceleration from zero to top speed is achieved, even though this may only be achieved one time before the energy storage must be recharged. The short charge and discharge cycles of supercapacitors and the high power densities, as compared to batteries, makes supercapacitors particularly advantageous for the proposed configuration for rapidly reaching top speed.

The energy storage may comprise a battery. The battery may comprise electrically chargeable and dischargeable cells. A battery has a higher energy density than supercapacitors, which means that it suitable for continuously driving the vehicle, but the lower power density of the batteries makes them less suitable for rapid acceleration. A battery is particularly advantageous when used together with a freewheel allowing the powertrain to be operated by an electric motor with the combustion engine turned off, as described above.

The powertrain may further be configured for supplying torque to an additional drive wheel, and the connection or final drive may have an additional output for supplying torque to the additional drive wheel. If the connection is a final drive, it may comprise a differential for allowing the drive wheel and the additional drive wheel to rotate at different speeds. This way, traction of both wheels can be maintained while turning the vehicle, which means that torque can be supplied to both wheels and the vehicle can accelerate faster in a curve. The differential may be an open differential, a locking differential, or torque vectoring differential.

The connection may be configured to supply the same torque from its output and additional output at the same rotational speed of the output and the additional output. If the connection is a final drive, the torque supplied from the output and the additional output may be converted from a torque supplied to the input of the final drive at a fixed gear ratio.

The powertrain may further comprise a third electric motor configured to supply torque to the drivetrain between connection and the additional drive wheel. If the first electric motor is configured to supply torque between the connection and the drive wheel, as described above in relation to the first aspect, this allows for a balanced torque output to the two wheels, which helps in maintaining a stable course when accelerating.

The third electric motor is configured to have a changeable direction of the torque supplied to drivetrain. As for the corresponding configuration of the first electric motor, this technology facilitates a reverse driving of the vehicle without adding additional mechanical components to the drivetrain, which helps in keeping the weight of the vehicle low. The drivetrain may further comprise an additional connector for conveying torque from the additional output of the connection drive to the drive wheel. The additional connector may be configured to convey a torque to the additional drive wheel at a fixed gear ratio. The third electric motor may be configured to supply torque to the additional connector. The additional connector may comprise a drive axle.

The energy storage may be configured to supply electric energy to the third electric motor for driving the third electric motor. Additionally or alternatively, the third electric motor may be configured to function as a generator and generate electric energy from torque received from the drivetrain and to supply the electric energy to the energy storage.

The combustion engine may have an additional output for supplying additional torque. The powertrain may further comprise an additional drivetrain for conveying additional torque from the combustion engine to the additional drive wheel. The additional drivetrain comprises an additional coupling having an input coupled to additional output of the combustion engine for receiving additional torque therefrom and an output for supplying torque. The additional coupling has a first state of operation and a second state of operation, and additional torque supplied to the input of the coupling is conveyed to the output of the coupling in the first state of operation. In the first state of operation the input of the additional coupling is locked to the output of the additional coupling for avoiding slippage there between and in the second state of operation the input of the additional coupling is not locked to the output of the additional coupling for allowing slippage there between. The additional drivetrain further comprises an additional connection having an input coupled to the output of the additional coupling for receiving torque therefrom and an output for supplying torque to the additional drive wheel, wherein the input of the additional connection is coupled to the output of the additional coupling at a fixed gear ratio. The powertrain further comprises an additional first electric motor configured to supply torque to the additional drivetrain on the output-side of the additional coupling. When this powertrain is installed in a four-wheel vehicle, there is no need for final drive splitting the torque between two drive wheels. Thus, the weight of the powertrain is reduced and the vehicle can be made smaller and lighter, thus allowing for the acceleration and the fuel consumption of the vehicle to be improved.

The powertrain may further comprise an additional second electric motor configured to supply torque to the drivetrain via the input of the additional coupling. The additional second electric motor may be configured to supply torque to the additional drivetrain at the input of the additional coupling or between the additional output of the combustion engine and the input of the additional coupling. The energy storage may be configured to supply electric energy to the additional first electric motor for driving the additional first electric motor. The energy storage may also be configured to supply electric energy to the additional second electric motor for driving the additional second electric motor.

The additional drive train may have one or more of the features or functions described above in relation to the drive train. Additionally or alternatively, the additional drive train may be configured in a manner that is described above in relation to the drive train. For example, the additional connection may be configured to transfer a torque received at its input to its output, with the same understanding of transfer as described above. Further, the additional drivetrain may comprise a first additional freewheel positioned between the additional first electric motor and the combustion engine and having the corresponding function and further alternative features of first freewheel described above. Alternatively or additionally, the additional drivetrain may comprise a second additional freewheel positioned between the additional second electric motor and the combustion engine and having the corresponding function and further alternative features of second freewheel described above.

The above objects are also achieved by the second aspect of the present invention, which is constituted by a drivetrain for conveying torque from a combustion engine and a first electric motor to a drive wheel of a vehicle, wherein the combustion engine has an output for supplying torque. The drivetrain comprises a coupling having an input for being coupled to output of the combustion engine for receiving torque therefrom and an output for supplying torque, wherein the coupling has a first state of operation and a second state of operation. Torque supplied to the input of the coupling is conveyed to the output of the coupling in the first state of operation, wherein in the first state of operation the input of the coupling is locked to the output of the coupling for avoiding slippage there between, and in the second state of operation the input of the coupling is not locked to the output of the coupling for allowing slippage there between.

The drivetrain further comprises a connection having an input coupled to the output of the coupling for receiving torque therefrom and an output for supplying torque to the drive wheel, wherein the input of the connection is coupled to the output of the coupling at a fixed gear ratio. The drivetrain is further configured to receive torque from the first electric motor on the output-side of the coupling.

The drivetrain according to the second aspect may further comprise any configurations or features of the drivetrain described in relation to the first aspect.

For example, the drivetrain may further comprise a connector and the coupling may be a torque converter. The effects and advantages of the configurations and features are the same as described above.

The above objects are also achieved by the third aspect of the present invention, which is constituted by a land vehicle comprising a drive wheel and a powertrain according to the first aspect of the invention for supplying torque to the drive wheel. The vehicle may further comprise an additional drive wheel, and the powertrain may be configured for supplying torque to the additional drive wheel, and the connection may have an additional output for supplying torque to the additional drive wheel. The powertrain of the vehicle may further comprise any feature or configuration described in relation to the powertrain of the first aspect. The effects and advantages are also the same. The land vehicle may be a road vehicle.

The land vehicle may also comprise an additional pair wheels configured to be driven by electric energy from the energy storage. The additional wheels may be configured for steering the vehicle. Better traction when accelerating may be achieved this way.

BRIEF DESCRIPTION OF DRAWINGS

Different embodiments of the invention are presented with reference to the figures.

DETAILED DESCRIPTION

Figure 1:
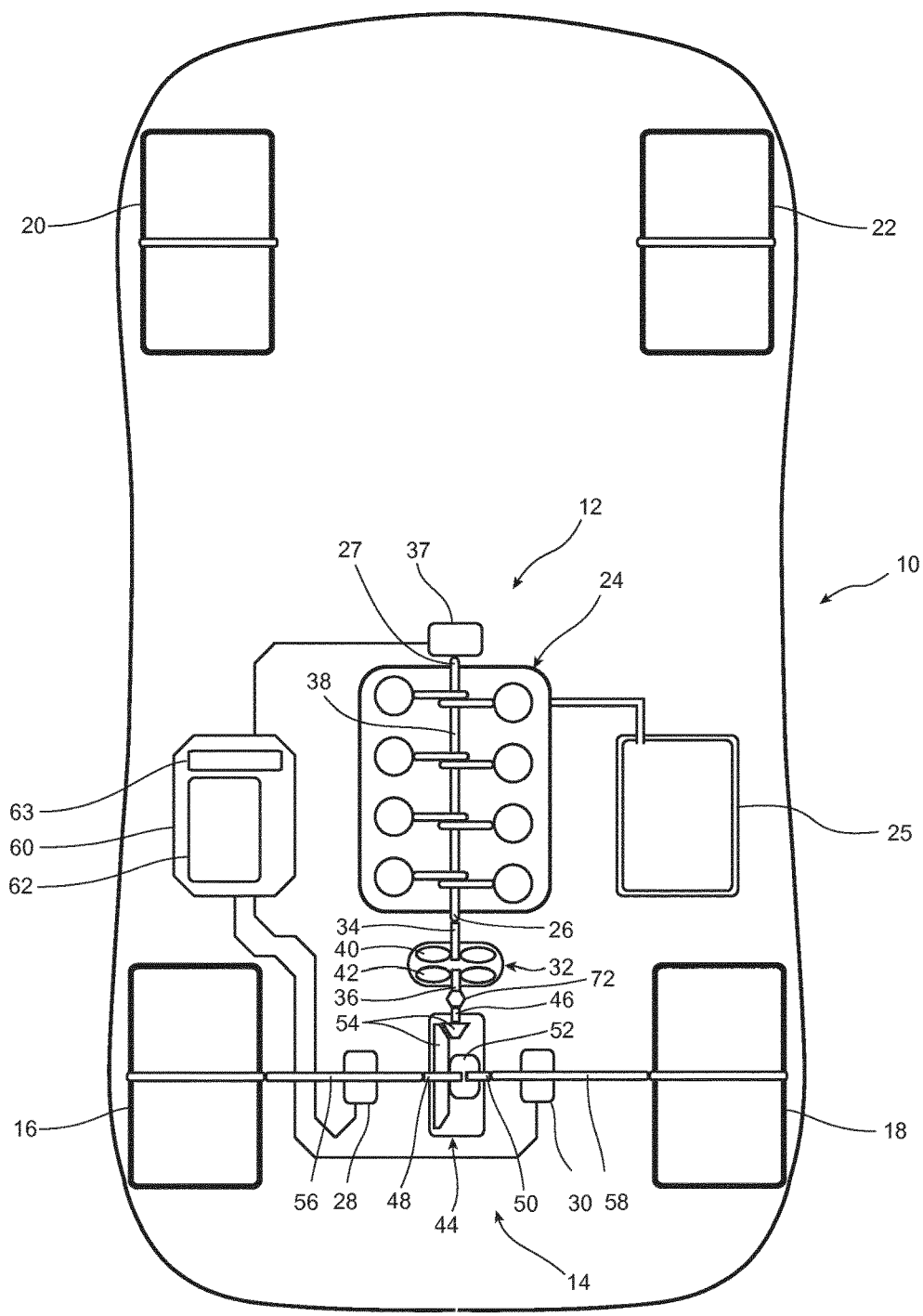
FIG. 1 being a schematic illustration a first embodiment of the invention showing a vehicle with a powertrain, FIG. 2 being a schematic illustration a second embodiment of the invention showing a vehicle with an alternative powertrain, FIG. 3 being a schematic illustration a third embodiment of the invention showing the rear part of a vehicle with an alternative powertrain, FIG. 4 being a schematic illustration a fourth embodiment of the invention showing a vehicle with an alternative powertrain, FIG. 5 being a schematic illustration a fifth embodiment of the invention showing a vehicle with an alternative powertrain, and FIG. 6 being a schematic illustration a sixth embodiment of the invention showing a vehicle with an alternative powertrain.

A first embodiment of the invention is illustrated in FIG. 1, showing a schematic top view of a land vehicle 10 in the form car. The vehicle 10 is fitted with a powertrain 12 having a drivetrain 14 that delivers torque to a pair of rear drive wheels 16 and 18. The vehicle 10 also has a pair of front wheels 20 and 22 for steering the vehicle 10.

The powertrain 12 has an internal combustion engine 24 that has an output 26 that supplies torque to the drivetrain 14 under operation. The combustion engine 24 is a cylinder engine that has a crankshaft 38 coupled to the output 26 of the combustion engine 24. The combustion engine 24 also has an input 27 coupled to the crank shaft 38. The combustion engine 24 is connected to and supplied with fuel from a gas tank 25.

The drivetrain 14 has a coupling 32 with an input 34 coupled to output 26 of the combustion engine 24 so that it can receive torque therefrom. The coupling 32 also has an output coupled to the rest of the drivetrain 14 through which it can supply torque. The coupling 32 is a torque converter having an impeller 40 coupled to the input 34 of the coupling 32 and a turbine 42 coupled to the output 36 of the coupling 32. The torque converter 32 is configured to provide a mechanical coupling between the input 34 and output 36 in the first state of operation, and a fluid coupling between the input 34 and output 36 in a second state of operation. In the first state of operation, the mechanical coupling rigidly locks the input 34 to the output 36. Thus, in the first state of operation, there is no slippage between the input 34 and the output 36 of the coupling 32, while in the second state of operation there can be a slippage between the input 34 and the output 36.

The drivetrain 14 also has a connection or final drive 44 with an input 46 coupled to the output 36 of the coupling 32 so that it can receive torque therefrom. The final drive 44 also has outputs 48 and 50 coupled to the drive wheels 16 and 18 for supplying torque to the drive wheels 16 and 18. The final drive 44 has an open differential 52 so that the outputs 48 and 50 can rotate at different speeds. The final drive 44 also has a bevel gear 54 to change the direction of rotation from the combustion engine 24 to the drive wheels 16 and 18. The bevel gear 54 converts the torque received at the input 46 to a higher torque supplied from the outputs 48 and 50 at a fixed gear ratio, provided that the drive wheels 16 and 18 rotate at the same speed. The higher torque is achieved by having a pinion coupled to the input 46. The pinion meshes with crown wheel, which in turn is coupled to the outputs 48 and 50 via the open differential 52, where the pinion has fewer teeth than the crown wheel.

The drivetrain 14 also comprises a pair of connectors 56 and 58 in the form of drive axles, each being coupled between the final drive 44 and one of the drive wheels 16 and 18. The connectors 56 and 58 convey torque at fixed gear ratios from the outputs 48 and 50 of the final drive 46 to the drive wheels 16 and 18.

The powertrain also has three electric motors. The first electric motor 28 and the third electric motor 30 are centered on the connectors 56 and 58 on either side of the final drive 44. Thus, they are configured to supply torque to the drivetrain 14 on the output-side of a coupling 32 of the drivetrain 14, more precisely between the final drive 44 and the drive wheels 16 and 18. The second electric motor 37 is coupled to input 27 of the combustion engine 24 and can supply torque to the drivetrain 14 via the crankshaft 38 and the output 26 of the combustion engine 24. Thus, the second electric motor 37 also supplies torque to the drivetrain 14 via the input 34 of the coupling 32.

The powertrain 12 has an energy storage 60 that includes a supercapacitor 62. The energy storage 60 supplies electric energy to the first electric motor 28, the second electric motor 37, and the third electric motor 30 so that they can operate and supply torque. The first electric motor 28 and the third electric motor 30 can function as generators and generate electric energy from torque received via the connectors 56 and 58. There are two ways by which electric energy is generated, either is some of the torque supplied from the combustion engine 24 via the coupling 32 and the final drive 44 converted to electric energy while driving, or by converting torque received from the drive wheels 16 and 18, that is by breaking the car. The second electric motor 37 can also function as a generator and generate electric energy from torque received via the input 27 of the combustion engine 24. This is also possible when the vehicle 10 is standing still with the coupling 32 in its second state of operation. The electric energy generated by the electric motors 28, 30, and 37 is supplied to the energy storage 60 and converted to energy that is stored in the supercapacitor 62.

The energy storage 60 also has a battery 63 composed of electrically chargeable and dischargeable cells. The battery 63 has a higher energy density but lower power density than the supercapacitor 62. Therefore, the battery 63 is primarily employed when driving at constant speed, while the supercapacitor 62 is primarily employed when accelerating.

The second electric motor 37 can function as a starter motor for the combustion engine 24, when the coupling 32 is in its second state of operation, by supplying torque to the crankshaft 38 via the input 27 of the combustion engine 24. Additionally, when the coupling 32 is in its second state of operation, the second electric motor 37 can supply torque to the combustion engine 24 so that the engine speed of the combustion engine increases.

In the embodiment described in relation to FIG. 1, no gearbox or gear shifting device is present in the drivetrain 14, and the input of the coupling 34 is coupled to the output 26 of the combustion engine 24 at a fixed gear ratio. Similarly, the input 46 of the final drive 44 is coupled to the output 36 of the coupling 32 at a fixed gear ratio.

The drivetrain 14 has a first freewheel 72 positioned between the first electric motor 28 and the combustion engine 24, more precisely between the final drive 44 and the coupling 32. The first freewheel 72 is configured to disengage its input from its output when the output rotates faster than the input. This allows the first electric motor 28 to drive the powertrain 12 with the combustion engine 24 turned off or idling. No resistance is thus generated by the combustion engine 24 or the coupling 32.

A typical driving scenario of the embodiment described in relation to FIG. 1 is now described. When starting the vehicle 10, the coupling is in its second state of operation. The second electric motor 37 is energized by the energy storage 60, so that the crankshaft 38 turns and the combustion engine 24 starts to operate. The vehicle is now idling without moving forward. Some torque is delivered to the drive wheels 16 and 18 via the torque converter 32, but the vehicle is prevented from moving by applying the brakes (not shown) of the drive wheels 16 and 18.

For a fast acceleration, additional electric energy is supplied from the energy storage 60 to the second electric motor 37 so that the combustion engine 24 quickly reaches a rotational speed with a high torque output and high torque conversion by the coupling 32. At the same time, electric energy is supplied from the energy storage 60 at maximum power. There will be a difference in the rotational speed between the input 34 and the output 36 of the coupling 32. The coupling 32 is a torque converter that increases the torque from the combustion engine 24. The difference in the rotational speed between the input 34 and the output 36 of the coupling 32 is gradually reduced when the vehicle 10 reaches higher speed, and the coupling 32 will change from its second state of operation to its first state of operation when there is a small or no difference in the rotational speed. The combustion engine and all three electric motors 28, 30, and 37 will continue to deliver maximum possible power until top speed is reached. If a slower acceleration is desired, less power is supplied to the combustion engine 24 and the electric motors 28, 30, and 37.

The first electric motor 28 and the second electric motor 30 have a changeable direction of the torque that is supplied to the connectors 56 and 58. When the coupling 32 is set in its second state of operation, the output 36 of the coupling 32 can rotate in a different direction than the input 34. Thus, when shifting from forward driving to reverse driving, the coupling 32 is set in its second state of operation and the rotational direction of the first electric motor 28 and the second electric motor 30 is changed. The combustion engine operates at low rotational speed and supplies a small torque that allows for a counter rotation of the coupling 32.

In alternative embodiments to the first embodiment, the second electric motor 37 is not present, or the second electric motor 37 is situated and supplies torque between the output 26 of the combustion engine 24 and the input of the coupling 32. Alternatively, the second electric motor 37 is positioned as in the first embodiment, and a fourth electric motor is situated and supplies torque between the output 26 of the combustion engine 24 and the input 34 of the coupling 32, or the fourth electric motor is situated and supplies torque between the output 36 of the coupling 32 and the input of the connection or final drive 44.

Figure 2:
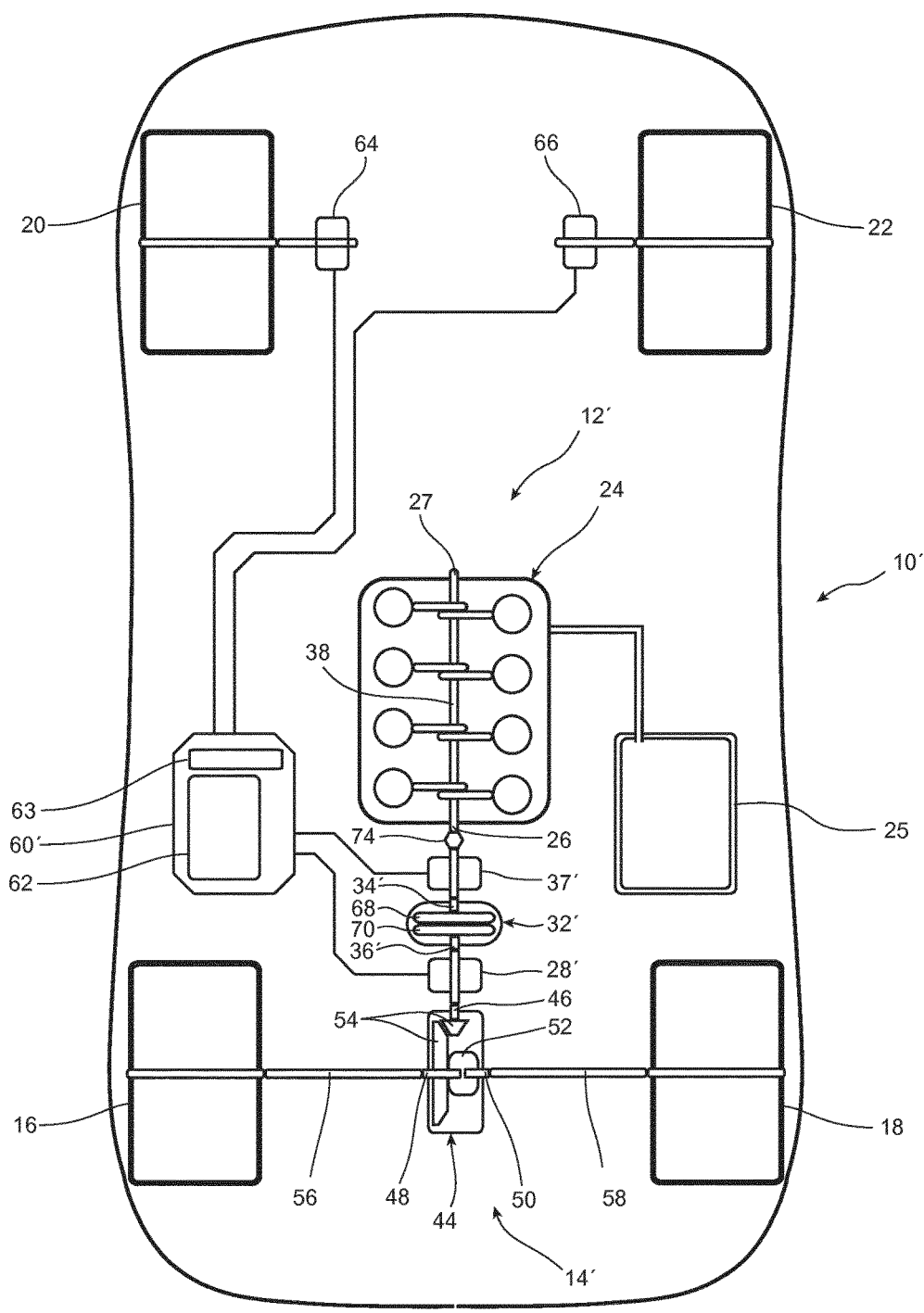

A second embodiment of the invention is illustrated in FIG. 2, showing a schematic top view of a land vehicle 10 in the form car. Many of the components and functions are the same as in the first embodiment described in relation to FIG. 1, and the number indexing has been maintained, but with a prime on features that have changed but have related function. The differences between the embodiments are discussed below.

In the second embodiment, the third electric motor is not present, and the first electric motor 28' is situated between the output 36' of the coupling 32' and the input 46 of the connection or final drive 44. Thus, all torque supplied by the first electric motor 28' to the drive wheels 16 and 18 is conveyed via the final drive 44. The second electric motor 37' is situated and supplies torque between the output 26 of the combustion engine 24 and the input of the coupling 32', thus supplying torque to the drivetrain 14' at the input of the coupling 32'.

The drivetrain 14' has a second freewheel 74 positioned between the second electric motor 37' and the combustion engine 24. The second freewheel 74 is configured to disengage its input from its output when the output rotates faster than the input. This allows the second electric motor 37' to drive the powertrain 12' with the combustion engine 24 turned off or idling. No resistance is thus generated by the combustion engine 24 The second electric motor 37' is on the input-side of the coupling 32', but the second freewheel 74 prevents it from functioning as a starter motor and adjusting the rotational speed of the combustion engine 24.

The coupling 32' is a wet clutch having a driving member 68 coupled to the input 34' of the coupling 32' and a driven member 70 coupled to the output 36' of the coupling 32'. The torque converter 32 provides a mechanical coupling between the input 34' and output 36' in the first state of operation, and there is no fluid coupling between the input 34' and output 36' in a second state of operation. Thus, in the first state of operation, there is no slippage between the input 34' and the output 36' of the coupling 32', while in the second state of operation there is in an essentially frictionless slippage between the input 34' and the output 36'.

The vehicle 10' also has a fourth electric motor 64 coupled to one of the front wheels 20 and a fifth electric motor 66 coupled to the other front wheel 22. The fourth electric motor 64 and the fifth electric motor 66 are connected to the energy storage 60' so that they can receive electric energy therefrom and supply torque to the front wheels 20 and 22 and accelerate the vehicle 10. The fourth electric motor 64 and the fifth electric motor 66 can also generate electric energy that is stored in the energy storage 60' by receiving torque from and breaking the front wheels 20 and 22.

A typical driving scenario of the embodiment described in relation to FIG. 2 is now described. The vehicle 10 is started in the same way as in the first embodiment, with the difference that the torque is supplied to the crankshaft 38 via the output 26 of the combustion engine 24. The coupling 32' is in its second state of operation. No torque is delivered to the drive wheels 16 and 18 via the coupling 32', since there is almost a frictionless slippage between the input 34 and output 36 of the torque converter 32. Thus, it is not necessary to apply the brakes (not shown) of the drive wheels 16 and 18 for preventing the vehicle from being driven forward.

For a fast acceleration, electric energy is supplied at maximum power from the energy storage 60' to the first electric motor 28', the fourth electric motor 64, and the fifth electric motor 66. The combustion engine 24 is brought to a rotational speed at which it can efficiently supply a torque by its own accord. Initially, there will be a difference in the rotational speed between the input 34' and the output 36' of the coupling 32' with the input 34' rotating faster. The difference in the rotational speed between the input 34' and the output 36' of the coupling 32' is gradually reduced when the vehicle 10' reaches higher speed, and the coupling 32' will change from its second state of operation to its first state of operation when there is a small or no difference in the rotational speed. The combustion engine 24, the first electric motor 28', the fourth electric motor 64, and the fifth electric motor 66 continue to deliver maximum possible power until top speed is reached.

If a slower acceleration is desired, less power is supplied to the combustion engine 24 and the electric motors 28', 64, and 66. Additionally, at a lower acceleration, the fourth electric motor 64 and the fifth electric motor 66 are not used for supplying torque.

In alternative embodiments to the second embodiment, the second electric motor 37 is not present, or the second electric motor 37' is instead coupled to input 27 of the combustion engine 24 and can supply torque to the drivetrain 14' via the crankshaft 38 and the output 26 of the combustion engine 24.

Figure 3:
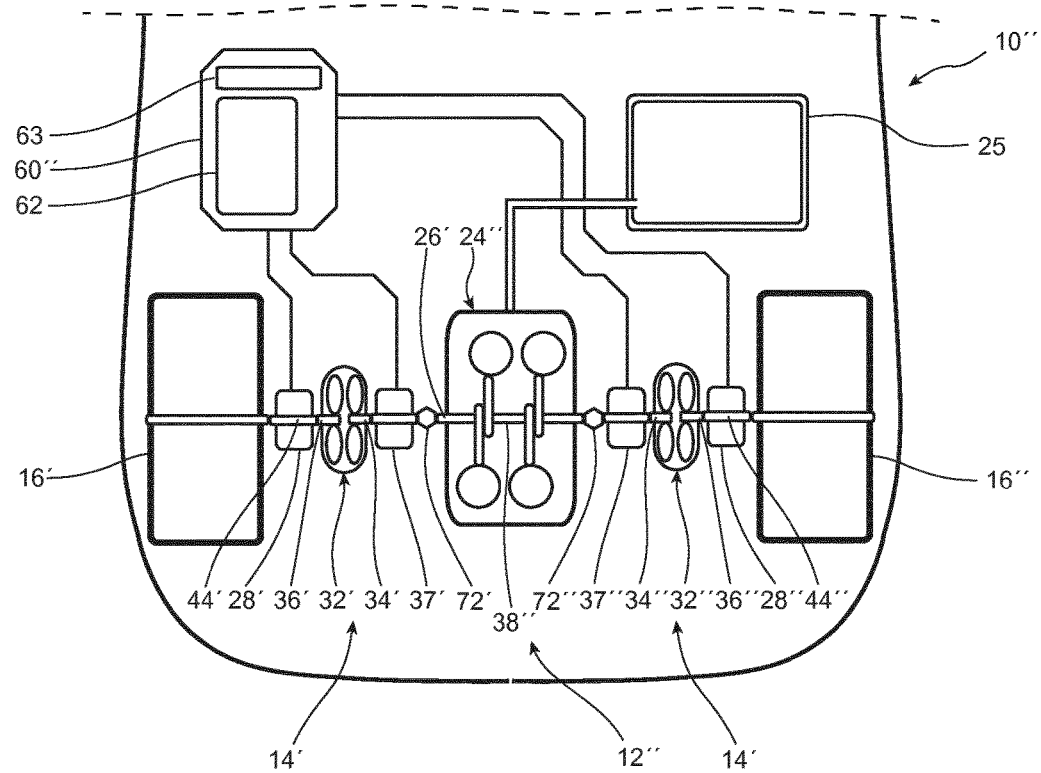

A third embodiment of the invention is illustrated in FIG. 3, showing a schematic top view of the rear of a land vehicle 10 in the form car. Many of the components and functions are the same as in the first embodiment described in relation to FIG. 1, and the number indexing has been maintained, but with a prime on features that have changed but have related function. Features that are not present in the first embodiment, but have a similar function as a feature in the first embodiment, have been given the same number index, but with a double prime. The differences between the embodiments are discussed below.

In the third embodiment, the third electric motor is not present and the drive train 14' supplies torque from the first electric motor 28' and the combustion engine 24" to a rear drive wheel 16'. The output 36' of the coupling 32' is connected to the drive wheel 16' by a connection 44' in the form of an axle transferring a torque there between without a conversion. This way, the output 36' of the coupling 32' and the drive wheel 16' are rotationally locked and rotate at the same rotational speed.

The first electric motor 28' connect to the drive train 14' and supply torque via the connection or axle 44'. The second electric motor 37' is situated and supplies torque between the output 26' of the combustion engine 24" and the input 34' of the coupling 32', thus supplying torque to the drivetrain 14' at the input-side of the coupling 32'. The coupling 32' is a torque converter and has the same function for the drivetrain 14' as the coupling of the first embodiment described in relation to FIG. 1.

The combustion engine 24" has an additional output 26" that supplies an additional torque. The output 26 and the additional output 26" are connected via the camshaft 38" and are located on opposite sides of the combustion engine 24'. The powertrain 12" has an additional drivetrain 14" that can convey additional torque from the combustion engine 24" to an additional rear drive wheel 16".

Similar to the drivetrain 14', the additional drivetrain 14" has an additional coupling 32" in the form of a torque converter with an input 34" coupled to additional output 26" of the combustion engine 24" so that it can receive torque therefrom. The additional coupling 32" has a first state of operation and a second state of operation. Additional torque that is supplied to the input 34" of the additional coupling 32" is conveyed to the output 36" of the coupling 32" in the first state of operation.

In the first state of operation, the input 34" of the additional coupling 32" is locked to the output 36" of the additional coupling 32" so that slippage there between is avoided. In the second state of operation, the input 34" of the additional coupling 32" is not locked to the output 36" of the additional coupling 32" so that slippage there between is allowed. Thus, the additional coupling 32" has the same function as the coupling 32'.

The additional drivetrain 14" has an additional connection 44" with an input 46" coupled to the output 36" of the additional coupling 32" for receiving torque therefrom and an output 48" for supplying torque to the additional drive wheel 16". The input 46" of the additional connection 44" is coupled to the output 36" of the additional coupling 32".

The output 36" of the additional coupling 32" is connected to the additional drive wheel 16" by an additional connection 44" in the form of an additional axle transferring a torque there between without a conversion. This way, the output 36" of the coupling 32" and the additional drive wheel 16" are rotationally locked and rotate at the same rotational speed.

An additional first electric motor 28" connect to the additional drive train 14" and supply torque to the drivetrain 14" via the additional connection or axle 44". An additional second electric motor 37" is situated and supplies torque between the additional output 26" of the combustion engine 24" and the input 34" of the additional coupling 32", thus supplying torque to the additional drivetrain 14" at the input-side of the coupling 32'. The energy storage 60" is further configured to supply electric energy to the additional first electric motor 28" and the additional second electric motor 37".

The additional drivetrain 14" has an additional first freewheel 72" positioned between the additional second electric motor 37" and the combustion engine 24". This means that the additional first freewheel 72" is also positioned between the additional first electric motor 28" and the combustion engine 24". The first freewheel 72' and the additional first freewheel 72" allows for the vehicle 10" to be driven by the first electric motor 28', the second electric motor 37', the additional first electric motor 28", and the additional second electric motor 37" with the combustion engine 24" turned off or idling at low rotational speeds.

Figure 4:
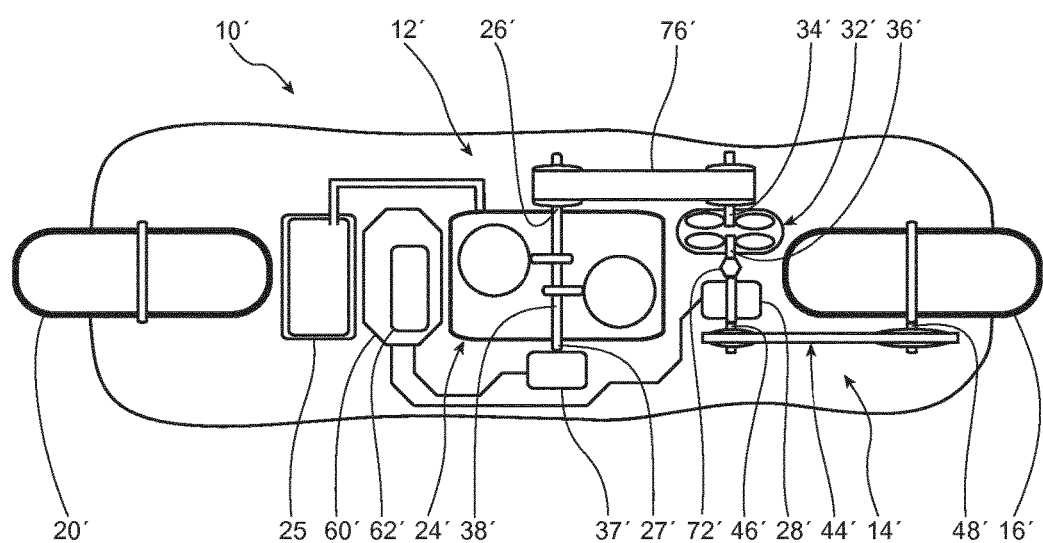

A fourth embodiment of the invention is illustrated in FIG. 4, showing a schematic top view of a land vehicle 10' in the form motorcycle. Many of the components and functions are the same as in the first embodiment described in relation to FIG. 1, and the number indexing has been maintained, but with a prime on features that have changed but have related function. The differences between the embodiments are discussed below.

In the fourth embodiment, the first electric motor 28' is located between the coupling 32' and the final drive 44'. The crank shaft 38' of the combustion engine 24' is oriented transverse to the longitudinal extension of the vehicle 10' The coupling 32' is a torque converter and has the same function as the coupling of the first embodiment described in relation to FIG. 1. The final drive 44' is a chain drive having an input sprocket with a fewer number of teeth than the output sprocket, which means that it converts a torque received at its input 46' to a greater torque supplied at its output 48'. The output of the final drive 44' is coupled to the drive wheel 16'. The drive wheel 16' is the rear wheel and the steering wheel 20' is the front wheel. A first freewheel 72' is positioned between the output 36' of the coupling 32' and the first electric motor 28' so that the electric motor 28' can drive the drivetrain 14' when the combustion engine 24' is turned off without any resistance form the combustion engine 24' or the coupling 32'.

The drivetrain 14' has a belt drive transferring torque from the output 26' of the combustion engine 24' to the input of the coupling 32'. A second electric motor 37' is coupled to an input 27' of the combustion engine 24' and can supply torque to the drivetrain 14' via the crankshaft 38' and the output 26' of the combustion engine 24'. The second electric motor 37' is also configured to functions as a starter motor and to regulate the rotational speed of the combustion engine, as in the first embodiment.

The powertrain 12' also comprises an energy storage 60" that has a supercapacitor 62' that supplies electric energy to the first electric motor 28' and the second electric motor 37'. The energy storage 60' does not have a battery as the energy storage described in relation to the first embodiment.

Figure 5:
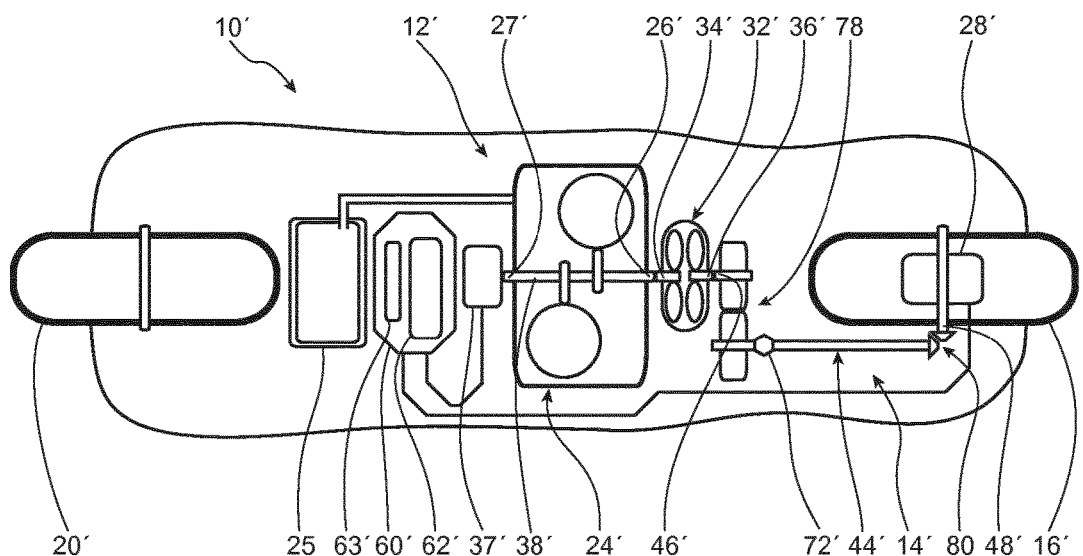

A fifth embodiment of the invention is illustrated in FIG. 5, showing a schematic top view of a land vehicle 10' in the form motorcycle. Many of the components and functions are the same as in the first embodiment described in relation to FIG. 1, and the number indexing has been maintained, but with a prime on features that have changed but have related function. The differences between the embodiments are discussed below.

In the fifth embodiment, the crank shaft 38' of the combustion engine 24' is oriented parallel to the longitudinal extension of the vehicle 10'. The coupling 32' is a torque converter and has the same function as the coupling of the first embodiment described in relation to FIG. 1. A connection 44' receives torque from the output 36' of the coupling 32' via an input 46' and supplies a torque to the drive wheel 16' via an output 48'. The connection 44' is a cardan drive transferring torque by way of a set of axles and cog wheels, including spurs 78 for a sideway shift of the torque and bevel gears 80 for changing the angle of the torque. The input 46' of the connection 44' is coupled to the output 36' of the coupling 32' at a fixed gear ratio. Further, the connection 44' transfers a torque received at its input 46' to its output 48' without a conversion. This means that, when the coupling is in its first state of operation, there is no torque conversion from the combustion engine 24' to the drive wheel 16'.

The first electric motor 28' is a wheel hub motor centered on the drive wheel 28' and configured to supply torque directly to the drive wheel 28'. This means that the first electric motor 28' is configured to supply torque to the drivetrain 14' on the output-side of the coupling 32' and that a part of the drive wheel 48' constitutes a part of the drive train 14'. The connection 44' has a freewheel 72' positioned between the input 46' and the output 48' of the connection 44', more precisely between the spurs 78 and bevel gears 80, so that the electric motor 28' can drive the drivetrain 14' when the combustion engine 24' is turned off without any resistance form the combustion engine 24', the coupling 32', or the spurs 78.

Similar to the embodiment described in relation to FIG. 4, the drive wheel 16' is the rear wheel and the steering wheel 20' is the front wheel. A second electric motor 37' is coupled to an input 27' of the combustion engine 24' and can supply torque to the drivetrain 14' via the crankshaft 38' and the output 26' of the combustion engine 24'. The second electric motor 37' is also configured to functions as a starter motor and to regulate the rotational speed of the combustion engine, as in the first embodiment. The powertrain 12' also comprises an energy storage 60' that has a supercapacitor 62' and a battery 63' that supplies electric energy to the first electric motor 28' and the second electric motor 37'. The fifth embodiment allows for a motorcycle 10' that can be driven at low rotational speeds of the combustion engine 24'.

Figure 6:
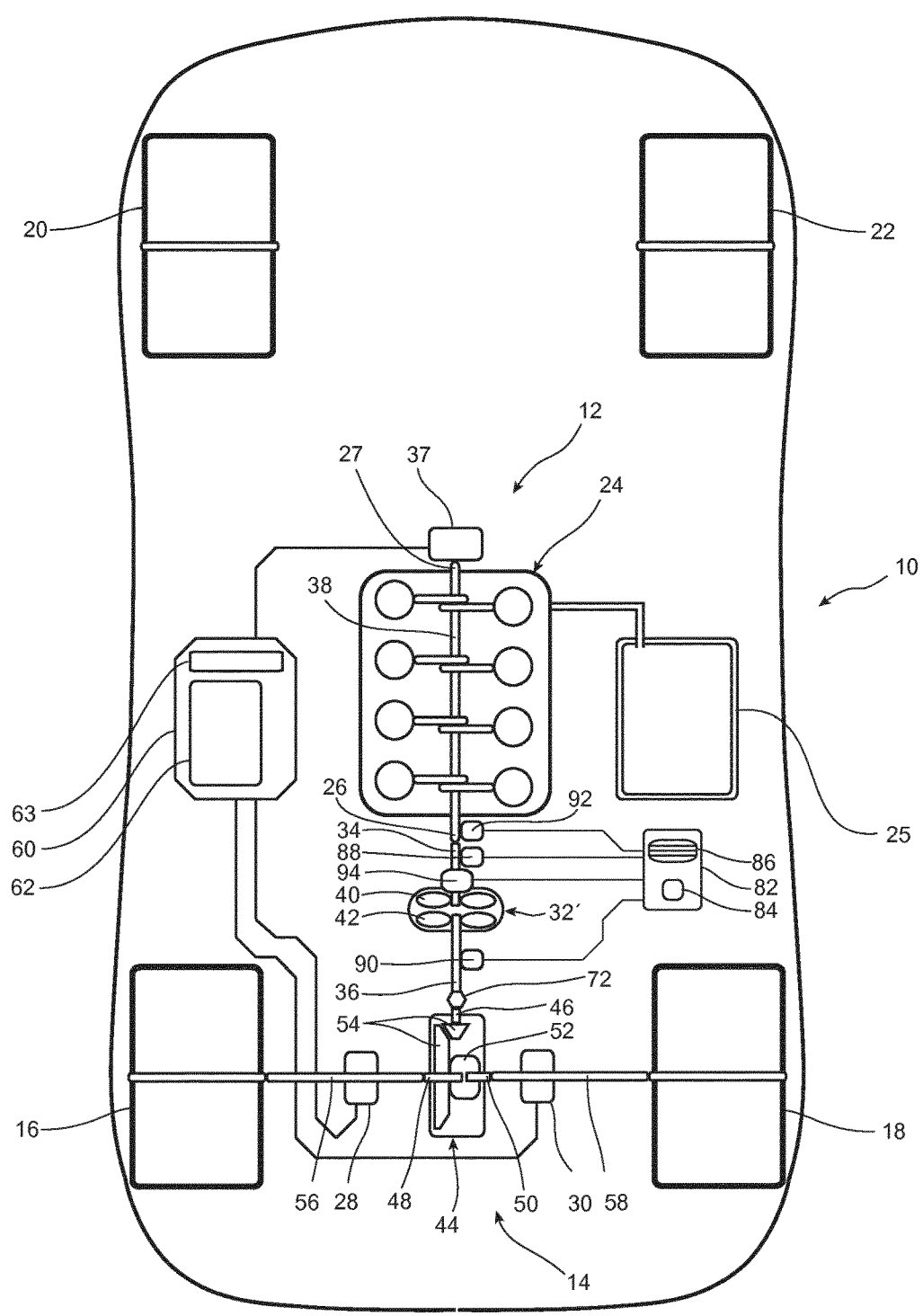

A sixth embodiment of the invention is illustrated in FIG. 6, showing a schematic top view of a land vehicle 10 in the form car. Many of the components and functions are the same as in the first embodiment described in relation to FIG. 1 and the number indexing has been maintained for similar features, but with primes on those having been changed. The vehicle also has a control unit 82 with a processor 84 and a non-volatile memory 86.

The control unit 82 is coupled to and controls the function of a hydraulically powered actuator 94. The impeller 40 and the turbine 42 both have a friction disc or plate (not shown). The impeller 40 is biased by a spring (not shown) that pulls the friction discs apart. The two friction discs face each other and when the actuator 94 is energized, it pushes the friction disc of the impeller 40 against the frictions disc of the turbine 42, thus achieving a lock, between the impeller 40 and the turbine 42, or a lock-up of the torque converter 32'. Thus with the actuator not energized, the torque converter 32' is in its second state, and when it is energized, the torque converter 32' is in its first state. The actuator 94 can indicate the state of the torque converter 32' to the control unit 82.

The control unit 82 is also coupled to a first sensor 88 in the form of a Hall sensor at the input 34 of the torque converter 32' that can indicate the rotational speed of the input 34. Similarly, the control unit 82 is also coupled to a second sensor 90 in the form of a Hall sensor at the output 36 of the torque converter 32' that can indicate the rotational speed of the output 36. The control unit 82 is also coupled to a third sensor 92 at the output 26 of the combustion engine 24 that can indicate the torque supplied by the combustion engine 24.

The memory 86 contains program instructions that, when executed by the processor 84, causes the processor, together with the actuator 94, the first sensor 88, the second sensor 90, and the third sensor 92 to determine if a number of conditions are fulfilled. The program instructions cause the processor to control the actuator 94.

A first set of conditions is that the torque converter 32' is in its second state, the rotational speed of the input 34 is the same as or greater than the rotational speed of the output 36, and torque is supplied to the input 34 of the torque converter 32' from the combustion engine 24. The program instructions will then cause the control unit 82, via the actuator 94, to change the state of the torque converter 32' from its second state to its first state if the rotational speed of the output 36 reaches the rotational speed of the input 34. Torque is further supplied to the powertrain 12 on the output-side of the torque converter 32' by the first electric motor 28 and the third electric motor 30 at the same time as torque being supplied to the input 34 of the torque converter 32' from the combustion engine 24.

A second set of conditions is that the torque converter 32' is in its first state and the input of the torque converter 32' is supplied with torque from the combustion engine 24. The program instructions will then cause the control unit 82 to, via the actuator 94, change the state of the torque converter 32' from its first state to its second state if the rotational speed of the output decreases or reaches the minimum rotational speed at which the combustion engine can operate and deliver torque.

A third set of conditions is that the torque converter 32' is in its first state and the input of the torque converter 32' is supplied with torque from the combustion engine 24. The program instructions will then cause the control unit 82 to, via the actuator 94, change the state of the torque converter 32' from its first state to its second state if the torque supplied to the input of the torque converter 32' from the combustion engine 24 increases.

A fourth set of conditions is that the torque converter 32' is in its first state, the rotational speed of the input 34 of the torque converter 32' is non-zero and decreasing, non-zero and constant, non-zero and increasing, or zero, and the input 34 of the torque converter 32' is supplied with torque from the combustion engine 24. The program instructions will then cause the control unit 82 to, via the actuator 94, change the state of the torque converter 32' from its first state to its second state if the torque supplied to the input 34 of the torque converter 32' from the combustion engine 24 increases.

In an alternative embodiment the first sensor 88, the second sensor 90, and the third sensor 92 are not present. Instead, the rotational speed of the input 34 of the torque converter 32' is indicated by a tachometer (not shown) of the vehicle 10, the rotational speed of the output 36 of the torque converter 32' is indicated by a speedometer (not shown) of the vehicle 10, and an indication that torque is supplied by the combustion engine 24 is derived from the setting of a gas pedal (not shown) of the vehicle 10.

ITEM LIST

10 land vehicle
12 powertrain
14 drivetrain
16 rear drive wheel
18 rear drive wheel
20 front wheel
22 front wheel
24 internal combustion engine
25 gas tank
26 output of combustion engine
27 input of combustion engine
28 first electric motor
30 third electric motor
32 coupling
34 input of coupling
36 output of coupling
37 second electric motor
38 crankshaft
40 impeller
42 turbine
44 final drive
46 input of final drive
48 output of final drive
50 output of final drive
52 open differential
54 bevel gear
56 connector
58 connector
60 energy storage
62 supercapacitor
63 battery
64 fourth electric motor
66 fifth electric motor
68 driving member
70 driven member
72 first freewheel
74 second freewheel
76 belt drive
78 spurs
80 bevel gears
82 control unit
84 processor
86 non-volatile memory
88 first sensor
90 second sensor
92 third sensor
94 actuator

The invention claimed is:
1. A powertrain for supplying torque to a drive wheel of a road vehicle, wherein the powertrain comprises:
(i) a combustion engine having an output for supplying torque, wherein the combustion engine is a reciprocating internal combustion engine;
(ii) a drivetrain for conveying torque from the combustion engine to the drive wheel, wherein the drivetrain comprises:
(a) a torque converter having an input coupled to the output of the combustion engine for receiving torque therefrom and an output for supplying torque, wherein the torque converter has a first state of operation and a second state of operation, the torque converter is configured to provide a mechanical coupling between the input and output of the torque converter in the first state of operation and a fluid coupling between the input and output of the torque converter in the second state of operation, and torque supplied to the input of the torque converter is conveyed to the output of the torque converter in the first state of operation and in the second state of operation, wherein in the first state of operation the input of the torque converter is locked to the output of the torque converter for avoiding slippage there between, and in the second state of operation the input of the torque converter is not locked to the output of the torque converter for allowing slippage there between, and
(b) a final drive having an input coupled to the output of the torque converter for receiving torque therefrom and an output for supplying torque to the drive wheel, wherein the input of the final drive is coupled to the output of the torque converter at a fixed gear ratio; and the powertrain further comprises:

(iii) a first electric motor configured to supply torque to the drivetrain on the output-side of the torque converters;
wherein the powertrain further comprises (iv) a second electric motor configured to supply torque to the drivetrain via the input of the torque converter.

2. The powertrain according to claim 1 further configured to, under conditions comprising: the torque converter being in its second state, a rotational speed of the input of the torque converter being the same as or greater than a rotational speed of the output of the torque converter, and the input of the torque converter being supplied with torque from the combustion engine:
change the state of the torque converter from its second state to its first state if the rotational speed of the output of the torque converter reaches the rotational speed of the input of the torque converter.

3. The powertrain according to claim 1, wherein the input of the torque converter is locked to the output of the combustion engine at a fixed gear ratio.

4. The powertrain according to claim 1, wherein the final drive is configured to transfer a torque received at its input to its output without a conversion.

5. The powertrain according to claim 1, wherein the final drive is configured to convert the torque received at its input to a torque supplied from its output.

6. The powertrain according to claim 1, wherein the powertrain further comprises:
(v) an energy storage configured to supply electric energy to the first electric motor for driving the first electric motor, wherein the energy storage comprises a supercapacitor.

7. A road vehicle comprising:
a drive wheel and a powertrain according to claim 1 for supplying torque to the drive wheel.

8. The road vehicle according to claim 7, wherein the road vehicle further comprises an additional drive wheel, and wherein the powertrain is configured for supplying torque to the additional drive wheel.

9. A powertrain for supplying torque to a drive wheel of a road vehicle, wherein the powertrain comprises:
(i) a combustion engine having an output for supplying torque, wherein the combustion engine is a reciprocating internal combustion engine;
(ii) a drivetrain for conveying torque from the combustion engine to the drive wheel, wherein the drivetrain comprises:
(a) a torque converter having an input coupled to the output of the combustion engine for receiving torque therefrom and an output for supplying torque, wherein the torque converter has a first state of operation and a second state of operation, the torque converter is configured to provide a mechanical coupling between the input and output of the torque converter in the first state of operation and a fluid coupling between the input and output of the torque converter in the second state of operation, and torque supplied to the input of the torque converter is conveyed to the output of the torque converter in the first state of operation and in the second state of operation, wherein in the first state of operation the input of the torque converter is locked to the output of the torque converter for avoiding slippage there between, and in the second state of operation the input of the torque converter is not locked to the output of the torque converter for allowing slippage there between, and (b) a final drive having an input coupled to the output of the torque converter for receiving torque therefrom and an output for supplying torque to the drive wheel, wherein the input of the final drive is coupled to the output of the torque converter at a fixed gear ratio; and the powertrain further comprises:
(iii) a first electric motor configured to supply torque to the drivetrain on the output-side of the torque converter;
the powertrain further configured to, under conditions comprising: the torque converter being in its first state and the input of the torque converter being supplied with torque from the combustion engine:
change the state of the torque converter from its first state to its second state if a rotational speed of the output of the combustion engine decreases and reaches a minimum rotational speed at which the combustion engine can operate and deliver torque.

10. A powertrain for supplying torque to a drive wheel of a road vehicle, wherein the powertrain comprises:
(i) a combustion engine having an output for supplying torque, wherein the combustion engine is a reciprocating internal combustion engine;
(ii) a drivetrain for conveying torque from the combustion engine to the drive wheel, wherein the drivetrain comprises:
(a) a torque converter having an input coupled to the output of the combustion engine for receiving torque therefrom and an output for supplying torque, wherein the torque converter has a first state of operation and a second state of operation, the torque converter is configured to provide a mechanical coupling between the input and output of the torque converter in the first state of operation and a fluid coupling between the input and output of the torque converter in the second state of operation, and torque supplied to the input of the torque converter is conveyed to the output of the torque converter in the first state of operation and in the second state of operation, wherein in the first state of operation the input of the torque converter is locked to the output of the torque converter for avoiding slippage therebetween, and in the second state of operation the input of the torque converter is not locked to the output of the torque converter for allowing slippage therebetween, and
(b) a final drive having an input coupled to the output of the torque converter for receiving torque therefrom and an output for supplying torque to the drive wheel, wherein the input of the final drive is coupled to the output of the torque converter at a fixed gear ratio; and the powertrain further comprises:
(iii) a first electric motor configured to supply torque to the drivetrain on the output-side of the torque converter;
the powertrain further configured to, under conditions comprising the torque converter being in its first state and the input of the torque converter being supplied with torque from the combustion engine: change the state of the torque converter from its first state to its second state if the torque supplied to the input of the torque converter from the combustion engine increases.

11. A powertrain for supplying torque to a drive wheel of a road vehicle, wherein the powertrain comprises:
(i) a combustion engine having an output for supplying torque, wherein the combustion engine is a reciprocating internal combustion engine;

(ii) a drivetrain for conveying torque from the combustion engine to the drive wheel, wherein the drivetrain comprises:
  (a) a torque converter having an input coupled to the output of the combustion engine for receiving torque therefrom and an output for supplying torque, wherein the torque converter has a first state of operation and a second state of operation, the torque converter is configured to provide a mechanical coupling between the input and output of the torque converter in the first state of operation and a fluid coupling between the input and output of the torque converter in the second state of operation, and torque supplied to the input of the torque converter is conveyed to the output of the torque converter in the first state of operation and in the second state of operation, wherein in the first state of operation the input of the torque converter is locked to the output of the torque converter for avoiding slippage therebetween, and in the second state of operation the input of the torque converter is not locked to the output of the torque converter for allowing slippage therebetween, and
  (b) a final drive having an input coupled to the output of the torque converter for receiving torque therefrom and an output for supplying torque to the drive wheel, wherein the input of the final drive is coupled to the output of the torque converter at a fixed gear ratio; and the powertrain further comprises:
(iii) a first electric motor configured to supply torque to the drivetrain on the output-side of the torque converter;
the powertrain further configured to, under conditions comprising the torque converter being in its first state and the rotational speed of the input of the torque converter is non-zero and decreasing, non-zero and constant, non-zero and increasing, or zero:
  change the state of the torque converter from its first state to its second state if the torque supplied to the input of the torque converter from the combustion engine increases.

12. A drivetrain for conveying torque from a combustion engine and a first electric motor to a drive wheel of a vehicle, wherein the combustion engine is a reciprocating internal combustion engine and has an output for supplying torque, and the drivetrain comprises:
  (a) a torque converter having an input for being coupled to the output of the combustion engine for receiving torque therefrom and an output for supplying torque, wherein the torque converter has a first state of operation and a second state of operation, the torque converter is configured to provide a mechanical coupling between the input and output of the torque converter in the first state of operation and a fluid coupling between the input and output of the torque converter in the second state of operation, and torque supplied to the input of the torque converter is conveyed to the output of the torque converter in the first state of operation and in the second state of operation, wherein in the first state of operation the input of the torque converter is locked to the output of the torque converter for avoiding slippage therebetween, and in the second state of operation the input of the torque converter is not locked to the output of the torque converter for allowing slippage therebetween; and
  (b) a final drive having an input coupled to the output of the torque converter for receiving torque therefrom and an output for supplying torque to the drive wheel, wherein the input of the final drive is coupled to the output of the torque converter at a fixed gear ratio; and
wherein the drivetrain is further configured to receive torque from the first electric motor on the output of the torque converter;
wherein the drivetrain is further configured to receive torque from a second electric motor via the input of the torque converter and between the final drive and the drive wheel.

\* \* \* \* \*